United States Patent
Okanoue et al.

[19]

[11] Patent Number: 5,862,345
[45] Date of Patent: Jan. 19, 1999

[54] SYSTEM FOR LOCATION MULTICASTING AND DATABASE MANAGEMENT FOR MOBILE SESSIONS IN ANY COMPUTER SUBNETWORKS WITHOUT USING A HOME ROUTER OF A HOME SUBNETWORK

[75] Inventors: Kazuhiro Okanoue; Tomoki Osawa, both of Tokyo, Japan

[73] Assignee: NEC Corporation, Japan

[21] Appl. No.: 696,785

[22] Filed: Aug. 15, 1996

[30] Foreign Application Priority Data

Feb. 7, 1996 [JP] Japan ............................. 8-020738

[51] Int. Cl.⁶ ............................................. G06F 13/00
[52] U.S. Cl. .................. 395/200.68; 370/312; 370/913; 455/432; 455/433
[58] Field of Search .......................... 370/402, 331, 370/312, 329, 401, 913; 455/435, 433, 432; 369/444.1; 395/200.68

[56] References Cited

U.S. PATENT DOCUMENTS

| | | | |
|---|---|---|---|
| 5,412,654 | 5/1995 | Perkins ........................................ | 370/312 |
| 5,442,633 | 8/1995 | Perkins et al. ............................. | 370/331 |
| 5,519,706 | 5/1996 | Bantz et al. ................................ | 455/435 |
| 5,548,586 | 8/1996 | Kito et al. .................................. | 370/349 |
| 5,572,528 | 11/1996 | Shuen ........................................ | 370/402 |
| 5,590,126 | 12/1996 | Mishra et al. ............................. | 370/329 |
| 5,608,726 | 3/1997 | Virgile ....................................... | 370/401 |
| 5,619,552 | 4/1997 | Karppanen et al. ...................... | 455/433 |

OTHER PUBLICATIONS

K. Okanoue, et al., "A New Mobile–IP Scheme –Architecture and Evolution Scenario", Institute of Information Processing, Fiftieth National Meeting, IU–7, 1995.

*Primary Examiner*—Le Hien Luu
*Attorney, Agent, or Firm*—Ostrolenk, Faber, Gerb & Soffen, LLP

[57] ABSTRACT

In a computer network where each mobile host is assigned a subnetwork-independent logical identifier (L-ID), the mobile host acquires a subnetwork-dependent geographical identifier (G-ID) from an agent-existing subnetwork and sends the G-ID to the home subnetwork of the mobile host for location registration if a beacon received therefrom is a first one or different from a previous one or acquires a G-ID from an agentless subnetwork and sends the G-ID to the home subnetwork if no beacons are received. At intervals, a multicast packet is sent from the mobile host, containing the acquired G-ID to the agentless subnetwork. A similar multicast packet is received from a second mobile host and the G-ID contained therein is stored in a database corresponding to the L-ID of the second mobile host. When establishing a session, a data packet is sent from the mobile host to the network along with a G-ID corresponding to a L-ID of the data packet stored in the database. No G-ID is appended if the L-ID of the data packet has no corresponding identifier in the database. At the home subnetwork, a data packet destined to a mobile host of a subnetwork is encapsulated with the G-ID of the mobile host and routed to the subnetwork.

23 Claims, 5 Drawing Sheets

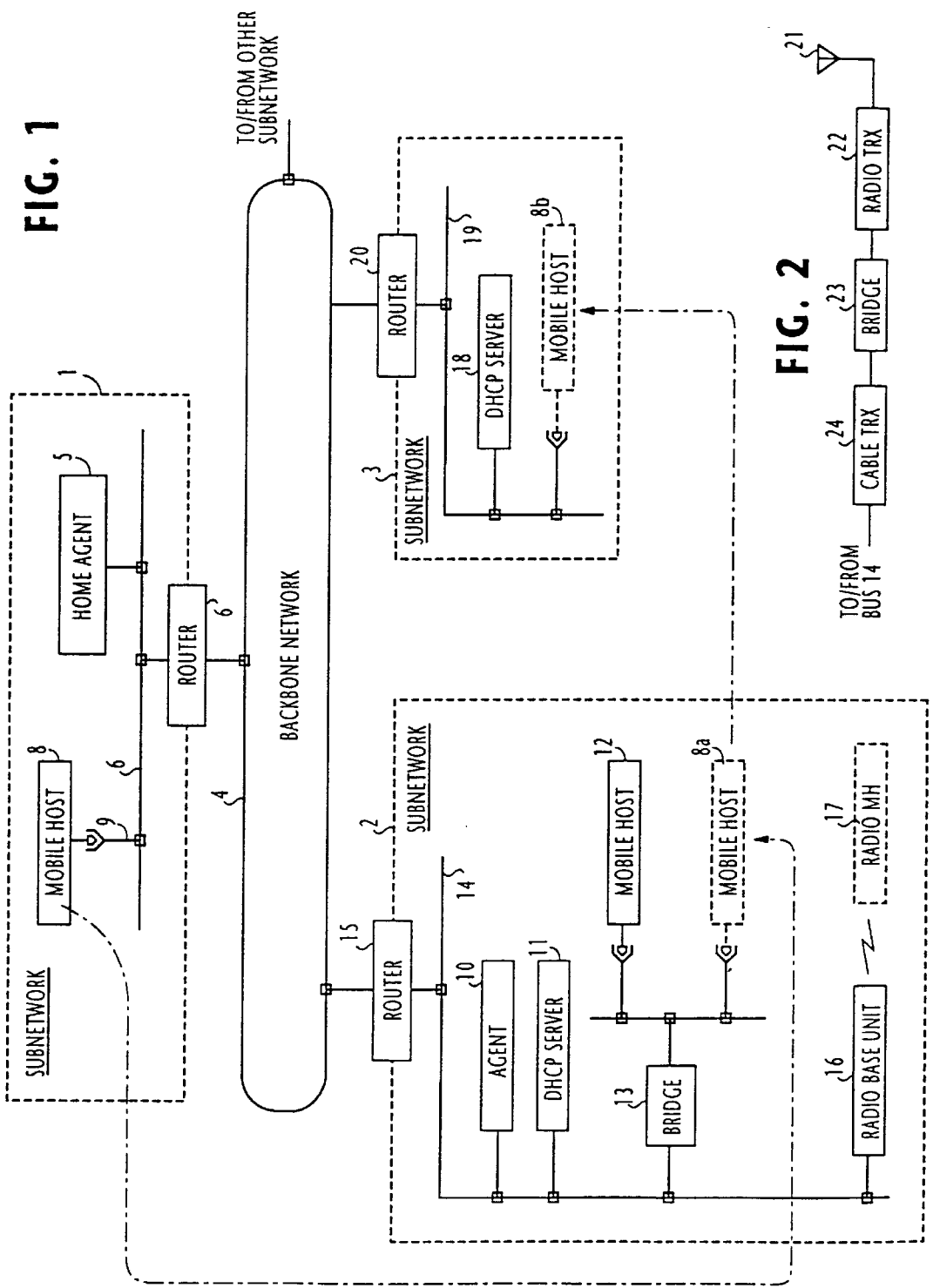

MOBILE HOST

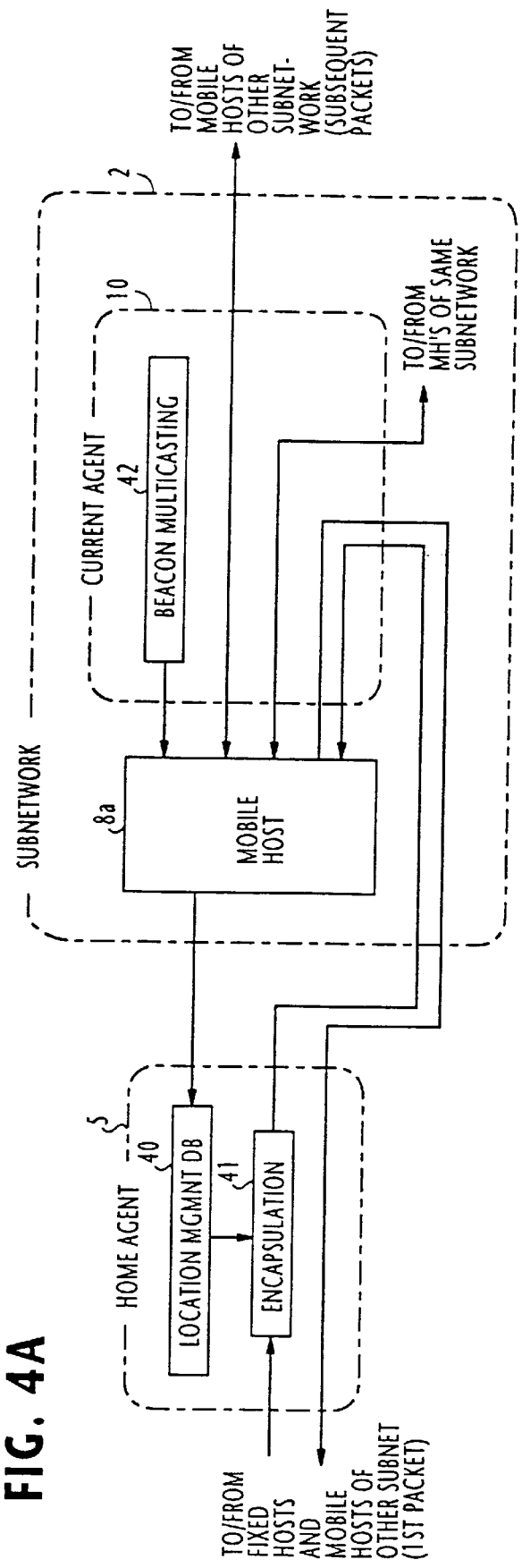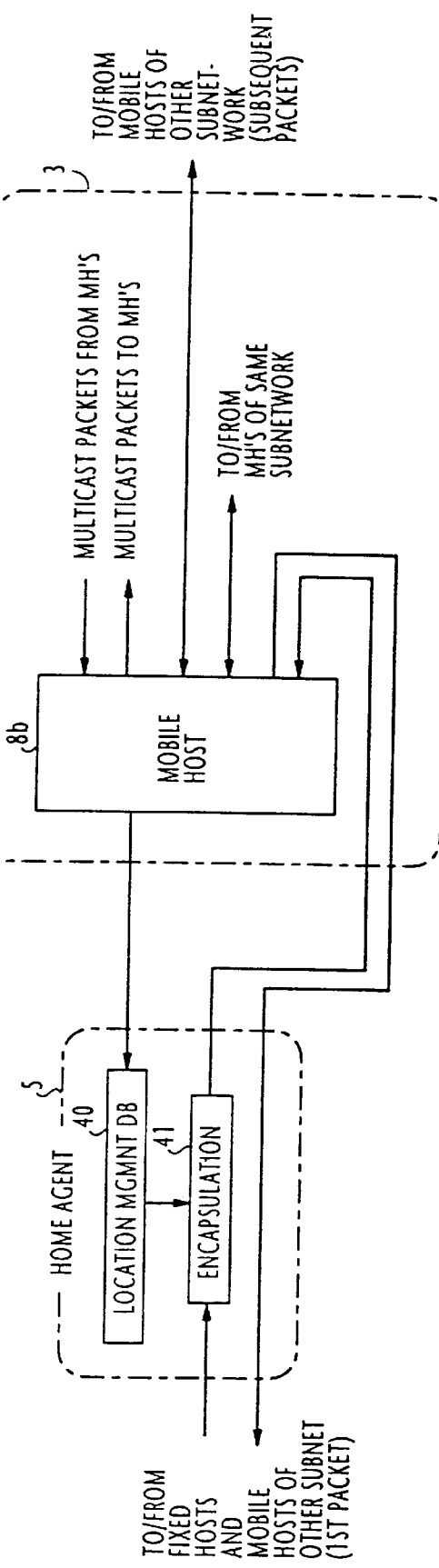

SYSTEM FOR LOCATION MULTICASTING AND DATABASE MANAGEMENT FOR MOBILE SESSIONS IN ANY COMPUTER SUBNETWORKS WITHOUT USING A HOME ROUTER OF A HOME SUBNETWORK

BACKGROUND OF THE INVENTION

1. Field of the Invention

The present invention relates generally to mobile computer networks, and more specifically to a mobile computer network which is composed of a plurality of subnetworks of different functionality for mobile hosts.

2. Description of Related Art

A computer network for mobile computing is described in a paper "A New Mobile-IP Scheme-Architecture and Evolution Scenario", Kazuhiro Okanoue et al., the Institute of Information Processing, the Fiftleth National Meeting, IU-7, 1995. This mobile computer network is composed of a plurality of subnetworks. To allow mobile hosts to perform session in any of the sub networks with fixed hosts, two addresses arc assigned to each mobile host. These arc a subnetwork-independent logical identifier and a subnetwork-dependent geographical identifier, whereas fixed hosts arc assigned only one address, i.e., logical identifier. Because of the difference in address assignment, a functionality known as "agent" is required for each subnetwork to establish sessions between mobile hosts and fixed hosts. The subnetwork which is identified by the logical address (identifier) of a mobile host is the home subnetwork of the mobile host and the agent of this subnetwork is known as a "home agent", and the agent of a subnetwork to which the mobile host is temporarily attached is known as a "current agent". The agent of a subnetwork provides multicasting of beacon packets for collecting location data from mobile hosts attached to it and provides database management of logical and geographical identifiers collected from the mobile hosts. The database is used to encapsulate a data packet with a geographical identifier if the destination is a mobile host.

However, all subnetworks are not necessarily provided with an agent facility. If a mobile host is moved to an agentless subnetwork, no session cannot be established with any of fixed hosts.

SUMMARY OF THE INVENTION

It is therefore an object or the present invention to allow mobile hosts in a computer network to perform a session with fixed hosts in any subnetwork regardless of the presence or absence of an agent facility in the subnetwork.

According to a broader aspect, the present invention provides a mobile host for use in a computer network formed by a plurality of interconnected subnetworks. The mobile host comprises means for transmitting a multicast packet containing a location identifier at periodic intervals to a subnetwork to which the mobile host is currently attached, means for receiving such multicast packer from a second mobile host via the subnetwork, a database for storing the location identifier of the received multicast packet, and means for transmitting a data packet to the network along with a location identifier if the destination of the data packer has the same location identifier in the database and transmitting the data packer to the network without a location identifier if the destination has no corresponding location identifier in the database. Preferably, a time lapse from the reception of the multicast packet is measured, and the measured time lapse is reset to zero in response to reception of a subsequent multicast packet, and a corresponding location identifier is erased from the database if the measured time lapse exceeds a critical value.

According to a second aspect, the present invention provides a mobile host for use in a computer network formed by a plurality of interconnected subnetworks, some of the subnetworks transmitting a beacon uniquely identifying the respective subnetworks, one of the subnetworks operating as a home subnetwork for the mobile host. The mobile host comprises means for acquiring a location identifier from a first subnetwork and transmitting the location identifier to the home subnetwork as location registration data if a beacon is first received from the first subnetwork or a beacon different from a previous one is received from the first subnetwork and acquiring a location identifier from a second subnetwork and transmitting the location identifier to the home subnetwork as location registration data if no beacons are received for a predetermined period, means for transmitting a multicast packet containing the acquired location identifier at periodic intervals to the second subnetwork, and means for receiving a multicast packet from a second mobile host via the second subnetwork. A database is provided for storing a location identifier contained in the received multicast packet. Further provided is a means for transmitting a data packet to the network along with a location identifier if the destination of the packet has the location identifier in the database and transmitting the data packet to the network without a location identifier if the destination has no corresponding location identifier in the database.

According to a third aspect, the present invention provides a computer network comprising a plurality of mobile hosts, each of the mobile hosts being assigned a logical identifier, and a plurality of interconnected subnetworks, ones of the subnetworks transmitting a beacon uniquely identifying the respective subnetworks, and one of the subnetworks operating as a home subnetwork for one of the mobile hosts. Each of the mobile hosts comprises means for acquiring a geographical identifier from a first subnetwork and transmitting the geographical Identifier to the home subnetwork as location registration data if a beacon is first received from the first subnetwork or a beacon different from a previous one is received from the first subnetwork and acquiring a geographical identifier from a second subnetwork and transmitting the geographical identifier to the home subnetwork as the location registration data if no beacons are received for a predetermined period, means for transmitting a multicast packet containing the acquired geographical identifier at periodic intervals to the second subnetwork, means for receiving a multicast packer from a second mobile host via the second subnetwork, a database for storing a geographical identifier contained in the received multicast packet corresponding to the logical identifier of the second mobile host, and means for transmitting a data packet to the network along with a geographical identifier corresponding to a logical identifier of the data packet stored in the database and transmitting the data packet to the network without a geographical identifier if the logical identifier of the data packet has no corresponding geographical identifier in the database. The home sub network includes means for encapsulating a data packet destined to a mobile host of a subnetwork with the geographical identifier received from the mobile host and forwarding the encapsulated data packet to the subnetwork.

BRIEF DESCRIPTION OF THE DRAWINGS

The present invention will be described in further detail with reference to the accompanying drawings, in which:

FIG. 1 is a block diagram of a computer network in which the mobile host of the present invention is used;

FIG. 2 is a block diagram of a radio base unit of a subnetwork;

FIG. 4A is a simplified block diagram illustrating various signal paths established to a mobile host when it is located in a subnetwork having an agent;

FIG. 4B is a simplified block diagram illustrating various signal paths established to a mobile host when it is located in a subnetwork where no agent exists;

DETAILED DESCRIPTION

Figure 3:
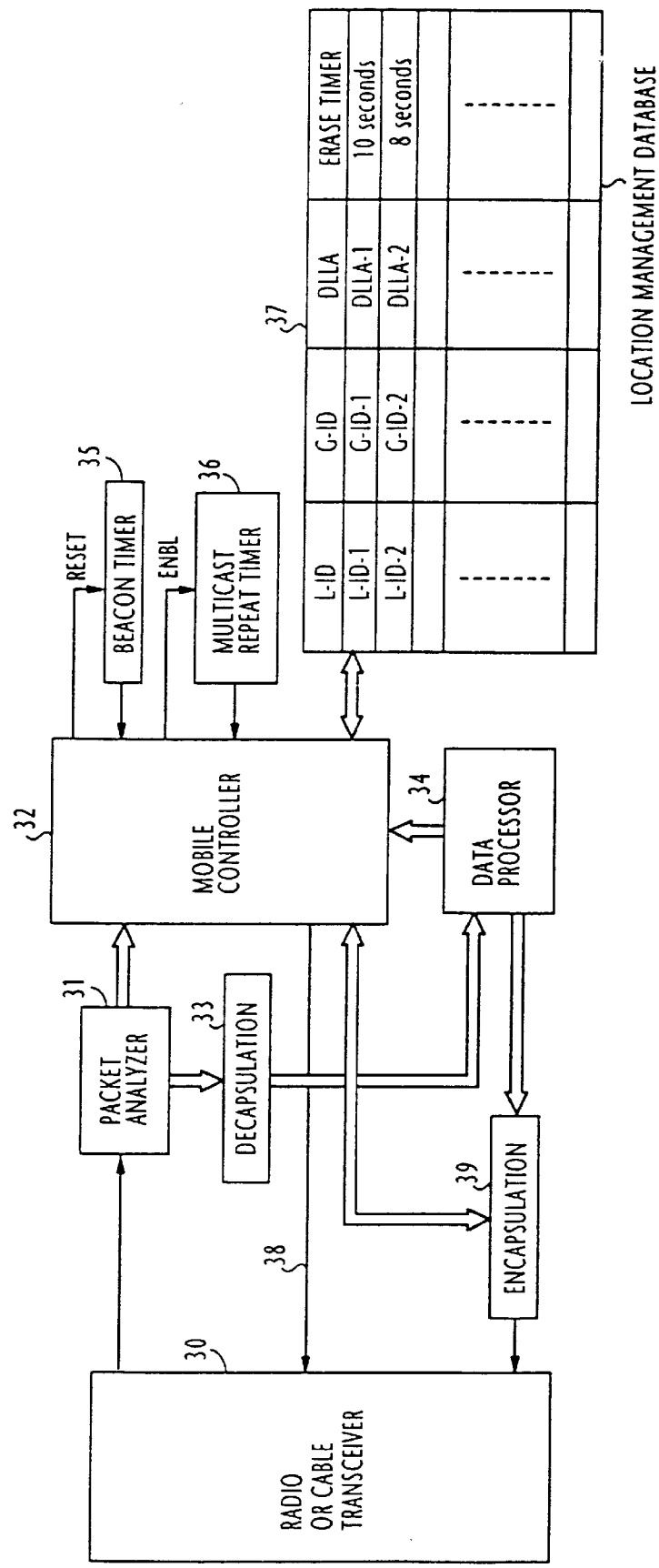
FIG. 3 is a block diagram of a mobile host according to the present invention.

FIG. 1 illustrates a computer network in which the mobile data terminal of the present invention is used. The network is made up of a plurality of subnetworks 1, 2 and 3 interconnected by a backbone network 4 to which ocher subnetwork may also be connected. As a typical example, subnetwork 1 includes a home agent 5 connected to a bus 6 which is connected via a router 7 to the backbone network 4. A mobile data terminal or host (hereinafter mobile host) 8, when normally located in the subnetwork, is detachably connected to the bus 6 via a transceiver cable 9. Subnetwork 2 may include an agent 10, a DHCP (dynamic host configuration protocol) server 11 both of which are connected to a bus 14, and a mobile host 12 connected thereto via a bridge 13, the bus 14 being connected to the backbone network via a router 15. Subnetwork 3 is shown to include a DHCP server 18 connected co a bus 19 which is connected to the backbone network 4 via a router 20. Each of the home and current agents maintains a location management database which maps logical and geographical identifiers and datalink layer addresses of each mobile host in the network. These identifiers and addresses are transmitted from mobile hosts as location data. Unlike other subnetworks, subnetwork 3 includes no agent.

Mobile host 8 may move from subnetwork 1 to subnetwork 2 as indicated by a dotted-rectangle 8a and then to subnetwork 3 where it is indicated by a dotted-rectangle 8b.

If it is desired to use a wireless link for mobile hosts in the subnetwork 2, a radio base unit 16 may be connected to the bus 14 to provide air interface between it and a radio mobile host 17. As illustrated in FIG. 2, the base unit 16 comprises an antenna 21, a radio transceiver 22, a bridge 23 and a cable transceiver 24 which is connected to the bus 14.

Details of the mobile host of the present invention is illustrated in FIG. 3. It comprises a transceiver 30 which may be either a radio or cable interface. A packet from the network is supplied from transceiver 30 to a packet analyzer 31 where the packet header is analyzed to determine whether it is a data packet or a control packer. From packet analyzer 31 control packets are supplied to a mobile controller 32 and data packets are applied to a decapsulator 33 where their header are removed. The output of decapsulator 33 is applied to a data processor 34 for processing. Controller 32 is associated with a beacon timer 35, a multicast repeat timer 36 and a location management database 37. Database 37 stores logical and geographical identifiers (L-ID and G-ID), datalink layer addresses (DLLA) and erase timer data of other mobile hosts within the same subnetwork. The database is updated when a new mobile host is entered into a subnetwork where no agent facility exists or an existing mobile host is moved from such a subnetwork. To permit updating of the databases of all mobile hosts located in an agentless subnetwork, each mobile host constantly exchanges a multicast control packet with all the other mobile hosts of the subnetwork to indicate its location in a manner as will be described in detail later. Such control packets are supplied from the controller 32 to the transceiver 30 via a line 38. In addition, each of the home and current agents constantly transmits a unique beacon packet to establish the identity of their subnetworks.

A data packet from data processor 34 is applied to an encapsulator 39 where it is encapsulated with an identifier or not depending on whether the destination is a mobile host of the same subnetwork or otherwise. Encapsulator 39 supplies the logical identifier of the data packet to the mobile controller 32. Using this logical identifier as a sortkey, the controller 32 searches through the database 37 for a geographical identifier. If the destination is a mobile host of the same subnetwork, a corresponding geographical identifier is found in the database and the data packet is encapsulated with it. If the destination is a fixed host or a mobile host of other subnetwork, no corresponding geographical identifier is found in the database and the data packet is passed through the encapsulator 39 without encapsulation.

Before going into details of the operation of the mobile controller 32, it is appropriate to briefly describe the paths of signals to and from the mobile host with reference to FIGS. 4A and 4B when the mobile host is attached to the agent-existing subnetwork 2 and the agentless subnetwork 3, respectively.

As illustrated in FIG. 4A, home agent 5 has a location management database 40 and an encapsulator 41 and current agent 10 includes a beacon multicasting facility 42. Beacon multicasting facility 42 operates at periodic intervals to send beacon packers to all mobile hosts in the subnetwork 2 Indicating the identification of the subnetwork 2. As will be described, the mobile host 8a sends a control packet indicating its location to the home agent 5 for location registration in the home agent database 40. Every packet from a fixed host or a first packet of mobile hosts located outside of the subnetwork 2 only contain the logical identifier of the host 8a. Therefore, these packets are initially routed to the host agent 5 and entered to encapsulator 41 where the location management database 40 is searched for a G-ID corresponding to the L-ID of these packets and the packets arc encapsulated with the G-ID for rerouting them to the current agent. Packets from the mobile host 8a to a fixed host are transmitted via the current agent 10 to home agent where they bypass the encapsulator 41 and are forwarded to the destination. A first return packet from the mobile host 8a in response to the first packet from an outside mobile host may contain the G-ID of the host 8a. As a result, subsequent packets from such outside mobile hosts are routed direct to the mobile host 8a via the current agent 10. Packets exchanged between mobile hosts within the subnetwork 2 contain G-ID as well as L-ID of the host 8a using their location management databases.

In FIG. 4B, the operation of mobile host 8b in subnetwork 3 differs from that of FIG. 4A in that, since subnetwork 3 has no packet multicasting facility, mobile host 8b sends multicast packets to every other mobile hosts of the subnetwork 3 and receive similar packets from such mobile hosts to update its database 37.

Figure 5:
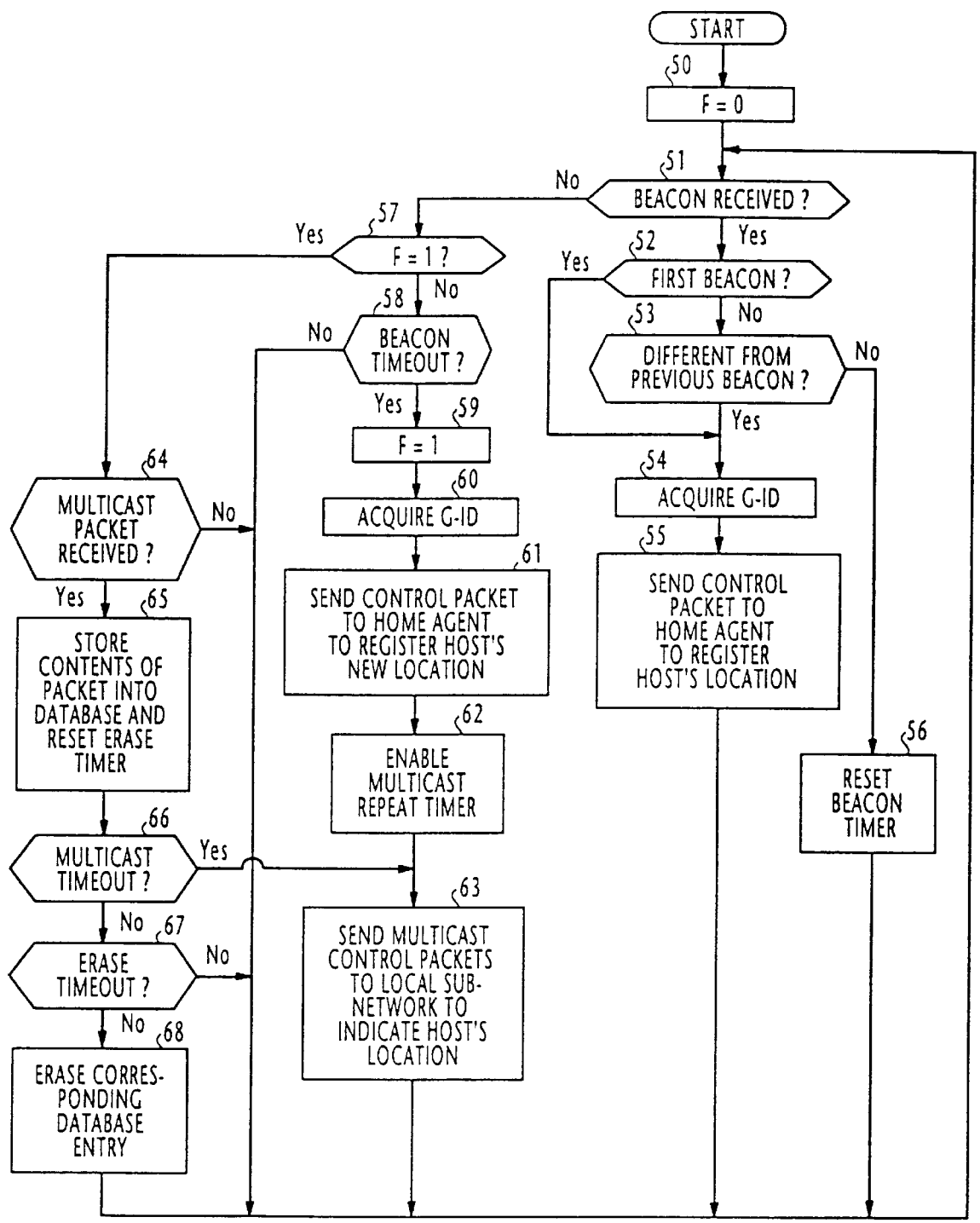
FIG. 5 is a flowchart of the operation performed by the controller of the mobile host.

The operation of the mobile controller 32 will now be explained in detail with the aid of the flowchart of FIG. 5.

Program execution begins with step 50 where the controller 32 sets an agentless subnetwork flag F to zero and proceeds to step 51 to determine whether a beacon packet is received. If the decision is affirmative at step 51, flow proceeds to step 52 to determine if the received beacon is the first beacon. If so, it is determined that the mobile host has entered a new subnetwork and flow proceeds to step 54 to send a control packet to the DHCP server of the subnetwork, requesting grant of a geographical identifier (G-ID). Otherwise, flow proceeds from step 52 to step 53 to determine if the received beacon is different from the previous one. If different, it is determined that the mobile host has moved from one subnetwork to another where an agent is also provided, since the beacon packet is unique to each agent-existing subnetwork. Affirmative decision at the beacon comparison step 53 causes flow to execute the beacon acquisition step 54. If same beacons are received successively, the decision at step 54 is negative and flow proceeds to step 56 to reset the beacon timer 35 and returns to step 51.

When a G-ID is granted, flow proceeds from step 54 to step 55 to send a control packet to the home agent 5, containing the logical identifier and the datalink layer address of the mobile host together with the newly accorded geographical identifier, to indicate the new location of the mobile host for registration in the location management database 40. Flow then returns to step 51.

If no beacon is received for an extended period of time, the decision at step 51 is negative, and flow proceeds to step 57 to check to see if the flag F is set to 1. If not, flow proceeds to step 58 to determine whether the beacon timer has expired. If this is the case, it is determined that the mobile host has entered an agentless subnetwork and flow proceeds from step 58 to step 59 where the mobile controller 32 sets the flag F to 1. Flow proceeds to step 60 to send a control packet to the DHCP server of the new subnetwork, requesting grant of a geographical identifier (G-ID). When the G-ID is granted, flow proceeds to step 61 to send a control packet to the home agent, containing the logical identifier (L-ID) and G-ID together with the datalink layer address of the mobile host to indicate the new location of the mobile host for making a registration in the home agent's location management database. At step 62, controller 32 enables the multicast repeat timer 36 and sends a multicast control packet to the local subnetwork, containing the L-ID, G-ID and datalink layer address (step 63). The multicast packet is copied in the subnetwork and multiple copies of the packet are propagated throughout the subnetwork for making a registration of the mobile host in the location management databases of other mobile hosts which are currently attached to the same subnetwork. Flow then returns to step 51 to repeat the above process.

With the flag F being set to 1, the subsequent decision at step 57 causes flow to proceed to step 64 to check to see if a multicast control packet is received from the serving subnetwork. If so, controller 32 proceeds from step 64 to step 65 to store the L-ID, G-ID and the datalink layer address contained in the received packet into a vacant entry of the location management database 57 and resets the erase timer data of the entry to start a timing action so that the timer value is incremented at periodic intervals. In this way, the database 37 is updated with respect to a mobile host which is located in the same subnetwork. Flow returns to step 51 to repeat the database updating routine on another mobile host.

At periodic intervals, the multicast repeat timer 36 produces a timeout signal. Following the execution of step 65, controller 32 enters step 66 to check for the presence of an output signal of the multicast repeat timer 36. If there is one, flow proceeds from step 66 to step 63 to send a multicast control packet to the local subnetwork again.

As long as a mobile host is present in the subnetwork, the erase timer data of each database entry is reset to zero at periodic intervals (step 65). When the erase timer data of a mobile host reaches some critical value, it is determined that the mobile host has ceased to exist in the subnetwork. When the decision at step 66 is negative, flow branches to step 67 to check to see if any of the erase timer data has reached a critical value. If not, control returns to step 51, and if so, flow proceeds to step 68 to erase the location data of a corresponding entry in the database.

With F=1, steps 64 and 68 are repeated and the database 37 of the mobile host will eventually loaded with the location data of all other mobile hosts attached to the same subnetwork, while updating the databases of all of these mobile hosts by periodically transmitting multicast packets.

Figure 6:
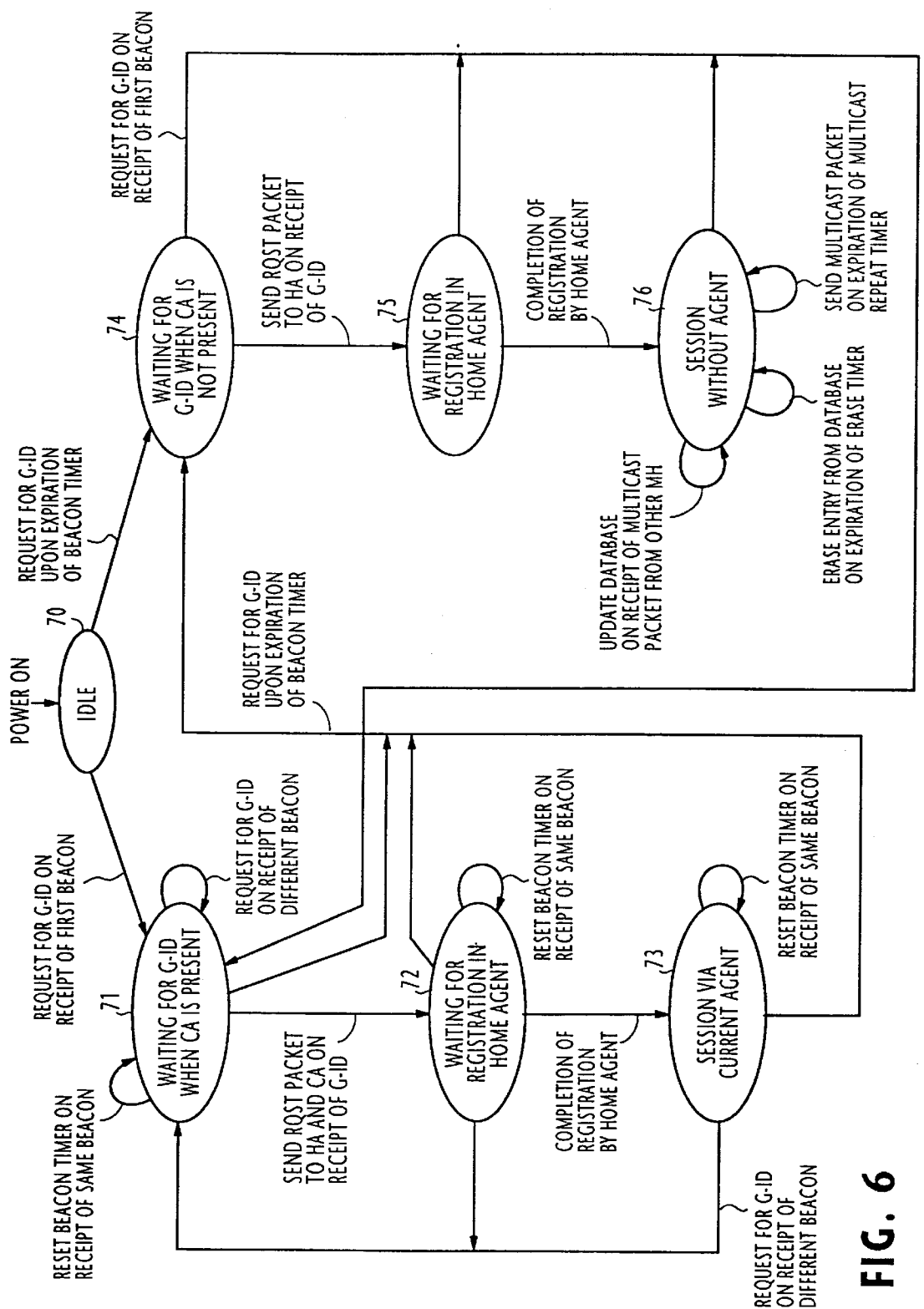
FIG. 6 is a state transition diagram useful for a full understanding of the present invention.

For a fuller understanding of the present invention, reference is made to a state transition diagram shown in FIG. 6. When the mobile host is powered on, it stays in an idle state indicated by numeral 70.

If a first beacon packet is received on entering a subnetwork in which an agent is present, the mobile host issues a packet to the subnetwork for requesting a C-ID, and enters state 71 where it waits for the grant of a G-ID, resets the beacon timer each time a beacon of the same bit pattern is received or requests a new G-ID if a different beacon is received. If the beacon timer expires in state 71, the mobile host moves to state 74. When a G-ID is granted in state 71, the mobile host sends a control packet to the home agent for registration of the location data of the mobile host and enters state 72. Until the registration is completed in the home agent, steps 51 to 56 are repeated to reset the beacon timer or request a new G-ID if the mobile host leaves the current subnetwork. In the latter case, the mobile host exits state 72 and returns to state 71 on receiving a new beacon or enters state 74 on the expiration of the beacon timer. On completion of the registration at the home agent, the mobile host moves from state 72 to state 73 in which it begins a session with another host in the network via the current agent, while executing steps 51 to 56, so that the beacon timer is repeatedly reset as long as the mobile host remains in the same subnetwork. If the mobile host moves out of the subnetwork during the session, a different beacon will be received and a request is made for the grant of a new G-ID from a new subnetwork and the mobile host leaves state 73 and returns state 71.

If the beacon timer expires during idle state 70, the mobile host moves to state 74 in which sends a G-ID request packet and waits for the grant of the G-ID, recognizing that it is attached to a subnetwork where no agent exists, while executing steps 51 and 52 for readying to receive a beacon from another subnetwork where an agent is present. On receipt of a G-ID from the agentless subnetwork in state 74, the mobile host sends a registration request packet to the home agent to communicates its new location and moves to state 75 to wait for the confirmation of the registration from the home agent, while executing steps 51 and 52 for readying to receive a beacon from another subnetwork where an agent is present. Upon completion of the registration at the home agent, the mobile host moves to state 76 to begin a session, while executing steps 51 and 52 for readying to receive a beacon from another subnetwork where an agent is present, executing steps 57 to 63 to send multicast packets on the expiration of the multicast repeat timer and executing steps 64 to 68 to update the database on receipt of a multicast packet from other mobile host and erase an entry from the database upon the expiration of the erase timer data of that entry. If a beacon is received during any of states 74, 75 and 76, the mobile host sends a G-ID request packet and moves to state 71, recognizing that it is now attached to a subnetwork where an agent exists.

It is seen from the foregoing that, by the provision of multicasting capability and a location management database in a mobile host, the mobile host is capable of performing sessions in any subnetworks with fixed hosts.

What is claimed is:

1. A mobile host for use in a computer network formed of a plurality of interconnected subnetworks which includes a home subnetwork for said mobile host and which are each connected to a respective plurality of other mobile hosts; said mobile host comprising:

means for periodically transmitting a multicast packet containing a location identifier to a respective one of the plurality of subnetworks to which the mobile host is currently attached, when said one of the subnetworks is not said home subnetwork, for delivery to said other mobile hosts that are connected to said respective one of the subnetworks without using a home router of said home subnetwork;

means for receiving at least another multicast packet from another mobile host via said one of the subnetworks;

a database for storing the location identifier of the received multicast packet; and means for transmitting a data packet to said one of the subnetworks together with a location identifier when the destination of the data packet corresponds to said stored location identifier and for transmitting said data packet without a location identifier to said one of the subnetworks when said destination has no corresponding stored location identifier.

2. A mobile host as claimed in claim 1, further comprising means for measuring a time lapse from the reception of said multicast packet, resetting the measured time lapse to zero in response to reception of a subsequent multicast packet, and erasing a corresponding location identifier from the database when the measured time lapse exceeds a critical value.

3. A mobile host as claimed in claim 1, wherein said another mobile host is attached to said one of the subnetworks.

4. A mobile host for use in a computer network formed of a plurality of interconnected subnetworks each connected to a respective plurality of other mobile hosts, at least a portion of said plurality of subnetworks each periodically transmitting a respective beacon uniquely identifying its respective subnetwork, a respective one of said subnetworks operating as a home subnetwork for the mobile host, said mobile host comprising:

means for acquiring a location identifier from a first type subnetwork and for transmitting the location identifier to the home subnetwork to represent location registration data of said mobile host when an initial beacon is received and when a beacon different from a previous one is received and for acquiring a location identifier from a second type subnetwork and transmitting the location identifier to the home subnetwork to represent said location registration data when no beacons are received for a predetermined period;

means for periodically transmitting a multicast packet containing the acquired location identifier to said second type subnetwork for delivery to said other mobile hosts that are connected to said second type subnetwork when said location identifier is acquired from said second type subnetwork without using a home router of said home subnetwork;

means for receiving at least another multicast packet from another mobile host via said second type subnetwork when said location identifier is acquired from said second type subnetwork;

a database for storing another location identifier which is contained in the received multicast packet; and means for transmitting a data packet to one of said first type subnetwork and said second type subnetwork together with a location identifier when the destination of the packet corresponds to said stored location identifier and for transmitting said data packet to said one of said first type subnetwork and said second type subnetwork without a location identifier when said destination has no corresponding stored location identifier.

5. A mobile host as claimed in claim 4, further comprising means for measuring a time lapse from the reception of said multicast packet, resetting the measured time lapse to zero in response to reception of a subsequent multicast packet, and erasing a corresponding location identifier from the database when the measured time lapse exceeds a critical value.

6. A mobile host as claimed in claim 4, wherein said another mobile host is attached to said second type subnetwork.

7. A mobile host as claimed in claim 4 wherein said first type subnetwork includes a subnetwork agent and wherein said second type subnetwork comprises an agentless subnetwork.

8. A computer network comprising:

a plurality of mobile hosts, each of the mobile hosts being assigned a logical identifier;

a plurality of interconnected subnetworks in which at least a portion of said subnetworks periodically transmit a corresponding beacon uniquely identifying its respective subnetwork, one of said subnetworks operating as a home subnetwork for one of said mobile hosts;

each of said mobile hosts comprising:

means for acquiring a geographical identifier from a first type subnetwork and for transmitting the geographical identifier to the home subnetwork to represent location registration data of said mobile host when an initial beacon is received and when a beacon different from a previous one is received and for acquiring a geographical identifier from a second type subnetwork and transmitting the geographical identifier to the home subnetwork to represent said location registration data when no beacons are received for a predetermined period;

means for periodically transmitting a multicast packet containing the acquired geographical identifier to said second type subnetwork for delivery to other mobile hosts that are connected to said second type subnetwork when said location identifier is acquired from said second type subnetwork without using a home router of said home subnetwork;

means for receiving at least another multicast packet from another mobile host via said second type subnetwork when said location identifier is acquired from said second type subnetwork;

a database for storing another geographical identifier which is contained in the received multicast packet and which corresponds to the logical identifier of said another mobile host; and means for transmitting a data packet to one of said first type subnetwork and said second type subnetwork together with a stored geographical identifier corresponding to a logical identifier of the data packet when said logical identifier corresponds to said stored geographical identifier and for transmitting said data packet to said one of said first type subnetwork and said second type subnetwork without a geographical identifier if the logical identifier of the data packet has no corresponding stored geographical identifier, said home subnetwork including means for encapsulating a data packet destined for one of said mobile hosts together with the geographical identifier received from said one of said mobile hosts and forwarding the encapsulated data packet to the corresponding subnetwork connected to said one of said mobile hosts.

9. A mobile host as claimed in claim 8 wherein said first type subnetwork includes a subnetwork agent and wherein said second type subnetwork comprises an agentless subnetwork.

10. In a computer network formed of a plurality of interconnected subnetworks which includes a hone subnetwork for said mobile host and which are each connected to a respective plurality of mobile hosts, a method comprising the steps of:

transmitting, periodically by a respective mobile host, a multicast packet containing a location identifier to a respective one of the plurality of subnetworks to which said respective mobile host is currently attached, when said one of the subnetworks is not said home subnetwork, for delivery to other mobile hosts that are connected to said respective one of the subnetworks without usina a hone router of said home subnetwork;

receiving, at said mobile host, at least another multicast packet via said one of the subnetworks and storing the location identifier of the received multicast packet in a database; and transmitting a data packet from the mobile host to said one of the subnetworks together with a location identifier when the destination of the data packet corresponds to said second location identifier and for transmitting said data packet from the mobile host to said one of the subnetworks without a location identifier when said destination has no corresponding stored location identifier.

11. A method as claimed in claim 10, further comprising the steps of measuring a time lapse from the reception of said multicast packet, resetting the measured time lapse to zero in response to reception of a subsequent multicast packet, and erasing a corresponding location identifier from the database when the measured time lapse exceeds a critical value.

12. In a computer network formed of a plurality of interconnected subnetworks each connected to a respective plurality of mobile hosts, at least a portion of said plurality of subnetworks each periodically transmitting a respective beacon uniquely identifying its corresponding subnetwork, a respective one of said subnetworks operating as a home subnetwork for a respective mobile host, a method comprising the steps of:

acquiring, by said respective mobile host, a location identifier from a first type subnetwork and transmitting the location identifier to the home subnetwork to represent location registration data of said respective mobile host when an initial beacon is received and when a beacon different from a previous one is received, and acquiring a location identifier from a second type subnetwork and transmitting the location identifier to the home subnetwork to represent said location registration data when no beacons are received for a predetermined period;

transmitting, periodically by said respective mobile host, a multicast packet containing the acquired location identifier from said mobile host to said second type subnetwork for delivery to said other mobile hosts that are connected to said second type subnetwork when said location identifier is acquired from said second type subnetwork without using a home router of-said home subnetwork;

receiving, at said mobile host, at least another multicast packet via said second type subnetwork when said location identifier is acquired from said second type subnetwork and storing another location identifier which is contained in the received multicast packet in a database; and transmitting a data packet from the mobile host to one of said first type subnetwork and said second type subnetwork together with a location identifier when the destination of the data packet corresponds to said stored location and transmitting said data packet from the mobile host to said one of said first type subnetwork and said second type subnetwork without a location identifier when said destination has no corresponding stored location identifier.

13. A method as claimed in claim 12, further comprising the steps of measuring a time lapse from the reception of said multicast packet, resetting the measured time lapse to zero in response to reception of a subsequent multicast packet, and erasing a corresponding location identifier from the database when the measured time lapse exceeds a critical value.

14. In a computer network comprising a plurality of mobile hosts and a plurality of interconnected subnetworks in which a portion of said plurality of subnetworks periodically transmit a corresponding beacon uniquely identifying the respective subnetwork, one of said subnetworks operating as a home subnetwork for one of said mobile hosts, each of the mobile hosts being assigned a logical identifier, a method comprising the steps of:

acquiring, by a respective one of such mobile hosts, a geographical identifier from a first type subnetwork and transmitting the geographical identifier to the home subnetwork to represent location registration data of said mobile host when. an initial beacon is received and when a beacon different from a previous one is received, and acquiring a geographical identifier from a second type subnetwork and transmitting the geographical identifier to the home subnetwork to represent said location registration data when no beacons are received for a predetermined period;

transmitting, periodically by said respective mobile host, a multicast packet containing the acquired geographical identifier from a mobile host to said second type subnetwork for delivery to said other mobile hosts that are connected to said second type subnetwork when said location identifier is acquired from said second type subnetwork without using a hone router of said home subnetwork;

receiving, at said mobile host, at least another multicast packet from another mobile host via said type second subnetwork when said location identifier is acquired from said second type subnetwork and storing another geographical identifier which is contained in the received multicast packet in a database and which corresponds to the logical identifier of said another mobile host;

transmitting a data packet from the mobile host to one of said first type subnetwork and said second type subnetwork together with a geographical identifier corresponding to a logical identifier of the data packet stored in the database when said logical identifier corresponds to said stored geographical identifier and transmitting said data packet from the mobile host to said one of said first t e subnetwork and said second type subnetwork without a geographical identifier if the logical identifier of the data packet has no corresponding stored geographical identifier; and encapsulating, at said home subnetwork, a data packet destined for one of said mobile hosts together with the geographical identifier received from said one of said mobile hosts and forwarding the encapsulated data packet to the corresponding subnetwork connected to said one of said mobile hosts.

15. A mobile host for use in a computer network formed by a plurality of interconnected subnetworks which includes a home subnetwork for said mobile host and which are each connected to a respective plurality of other mobile hosts; said mobile host comprising:

a first transmitter for periodically transmitting a multicast packet containing a location identifier to a respective one of the plurality of subnetworks to which the mobile host is currently attached, when said one of the subnetworks is not said home subnetwork, for delivery to said other mobile hosts that are connected to said respective one of the subnetworks without using a home router of said home subnetwork;

a receiver for receiving at least another multicast packet from another mobile host via said one of the subnetworks;

a database for storing the location identifier of the received multicast packet; and a second transmitter for transmitting a data packet to said one of the subnetworks together with a location identifier when the destination of the data packet corresponds to said stored location identifier and for transmitting said data packet without a location identifier to said one of the subnetworks when said destination has no corresponding stored location identifier.

16. A mobile host as claimed in claim 15, further comprising a measurer for measuring a time lapse from the reception of said multicast packet, resetting the measured time lapse to zero in response to reception of a subsequent multicast packet, and erasing a corresponding location identifier from the database when the measured time lapse exceeds a critical value.

17. A mobile host as claimed in claim 15, wherein said another mobile host is attached to said one of the subnetworks.

18. A mobile host for use in a computer network formed by a plurality of interconnected subnetworks each connected to a respective plurality of other mobile hosts, at least a portion of said plurality of subnetworks each periodically transmitting a respective beacon uniquely identifying its respective subnetwork, a respective one of said subnetworks operating as a home subnetwork for the mobile host, said mobile host comprising:

an acquirer for acquiring a location identifier from a first type subnetwork and for transmitting the location identifier to the home subnetwork to represent location registration data of said mobile host when an initial beacon is received and when a beacon different from a previous one is received and for acquiring a location identifier from a second type subnetwork and transmitting the location identifier to the home subnetwork to represent said location registration data when no beacons are received for a predetermined period;

a first transmitter for periodically transmitting a multicast packet containing the acquired location identifier to said second type subnetwork for delivery to said other mobile hosts that are connected to said second type subnetwork when said location identifier is acquired from said second type subnetwork without using a home router of said home subnetwork;

a receiver for receiving at least another multicast packet from another mobile host via said second type subnetwork when said location identifier is acquired from said second type subnetwork;

a database for storing another location identifier which is contained in the received multicast packet; and a second transmitter for transmitting a data packet to one of said first type subnetwork and said second type subnetwork together with a location identifier when the destination of the packet corresponds to said stored location identifier and for transmitting said data packet to said one of said first type subnetwork and said second type subnetwork without a location identifier when said destination has no corresponding stored location identifier.

19. A mobile host as claimed in claim 18, further comprising a measurer for measuring a time lapse from the reception of said multicast packet, resetting the measured time lapse to zero in response to reception of a subsequent multicast packet, and erasing a corresponding location identifier from the database when the measured time lapse exceeds a critical value.

20. A mobile host as claimed in claim 18, wherein said another mobile host is attached to said second type subnetwork.

21. A mobile host as claimed in claim 18 wherein said first type subnetwork includes a subnetwork agent and wherein said second type subnetwork comprises an agentless subnetwork.

22. A computer network comprising:

a plurality of mobile hosts, each of the mobile hosts being assigned a logical identifier;

a plurality of interconnected subnetworks in which at least a portion of said subnetworks periodically transmit a corresponding beacon uniquely identifying its respective subnetwork, one of said subnetworks operating as a home subnetwork for one of said mobile hosts;

each of said mobile hosts comprising:

an acquirer for acquiring a geographical identifier from a first type subnetwork and for transmitting the geographical identifier to the home subnetwork to represent location registration data of said mobile host when an initial beacon is received and when a beacon different from a previous one is received and for acquiring a geographical identifier from a second type subnetwork and transmitting the geographical identifier to the home subnetwork to represent said location registration data when no beacons are received for a predetermined period;

a first transmitter for periodically transmitting a multicast packet containing the acquired geographical identifier to said second type subnetwork for delivery to other mobile hosts that are connected to said second type subnetwork when said location identifier is acquired from said second type subnetwork without using a home router of said home subnetwork;

a receiver for receiving at least another multicast packet from another mobile host via said second type subnetwork when said location identifier is acquired from said second type subnetwork;

a database for storing another geographical identifier which is contained in the received multicast packet and which corresponds to the logical identifier of said another mobile host; and a second transmitter for transmitting a data packet to one of said first type subnetwork and said second type subnetwork together with a stored geographical identifier corresponding to a logical identifier of the data packet when said logical identifier corresponds to said stored geographical identifier and for transmitting said data packet to said one of said first type subnetwork and said second tore subnetwork without a geographical identifier when the logical identifier of the data packet has no corresponding stored geographical identifier, said home subnetwork including an encapsulator for encapsulating a data packet destined for one of said mobile hosts together with the geographical identifier received from said one of said mobile hosts and forwarding the encapsulated data packet to the corresponding subnetwork connected to said one of said mobile hosts.

23. A mobile host as claimed in claim 22 wherein said first type subnetwork includes a subnetwork agent and wherein said second type subnetwork comprises an agentless subnetwork.

* * * * *

UNITED STATES PATENT AND TRADEMARK OFFICE
CERTIFICATE OF CORRRECTION

PATENT NO. : 5,862,345  Page 1 of 2
DATED : Jan. 19, 1999
INVENTOR(S) : Kazuhiro Okanoue, et al.

It is certified that error appears in the above-identified patent and that said Letters Patent is hereby corrected as shown below:

On the title page, item [56], add the following refernces:

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | | 7- | 3 | 3 | 6 | 3 | 7 | 0 | 12/22/95 | Japan | | | |
| | | 9- | 1 | 3 | 9 | 7 | 4 | 7 | 05/27/97 | Japan | | | |
| | | 9- | 1 | 8 | 6 | 6 | 9 | 0 | 07/15/97 | Japan | | | |
| | | 9- | 2 | 6 | 1 | 2 | 6 | 5 | 10/03/97 | Japan | | | |
| | | 7- | 1 | 2 | 1 | 4 | 5 | 8 | 05/12/95 | Japan | | | |
| | | 9- | 1 | 7 | 2 | 4 | 5 | 1 | 06/30/97 | Japan | | | |
| | | | | | | | | | | | | | |

UNITED STATES PATENT AND TRADEMARK OFFICE
CERTIFICATE OF CORRRECTION

PATENT NO. : 5,862,345
DATED : Jan. 19, 1999
INVENTOR(S) : Kazuhiro Okanoue, et al.

Page 2 of 2

It is certified that error appears in the above-identified patent and that said Letters Patent is hereby corrected as shown below:

OTHER DOCUMENTS

| | |
|---|---|
| | V. Chickarmane, et al., INTERNETWORKING: RESEARCH AND EXPERIENCE, vol. 6, 209-227 (1995), "Implementing Mobile IP Routing in 4.3 BSD UNIX: A Case Study". |
| | K. Okanoue, et al., THE INSTITUTE OF ELECTRONICS, INFORMATION AND COMMUNICATION ENGINEERS, SSE95, IN95-64, CS95-113 (1995), "IP Mobility with Double IP Header". |
| | K. Okanoue, et al., PROCEEDINGS OF THE 1995 COMMUNICATIONS SOCIETY CONFERENCE OF IEICE, September 1995, pp. 136, "Intelligent Mobile Host with Foreign Agent Functionality". |
| | J. Ioannidis, et al., SIGCOMM '91 CONFERENCE - Communications Architectures & Protocols, September 1991, "IP-Based Protocols for Mobile Internetworking", pp. 235-245. |
| | F. Teraoka, et al., PROCEEDINGS OF THE 1992 IEEE 12th International Conference on Distributed Computing Systems, June 1992, "Design, Implementation, and Evaluation of Virtual Internet Protocol", pp. 170-177. |
| | D. Chess, et al., IEEE PERSONAL COMMUNICATIONS, vol. 2, no. 5, October 1995, pp. 34-49, "Itinerant Agents for Mobile Computing". |

Signed and Sealed this

Fourth Day of May, 1999

*Attest:*

Q. TODD DICKINSON

*Attesting Officer*   Acting Commissioner of Patents and Trademarks